July 13, 1937.  J. H. FRIEDMAN  2,087,087
BOLT MAKING MACHINE
Filed Nov. 13, 1935

Inventor
JOHN H. FRIEDMAN
By Richey & Watts
Attorneys

Patented July 13, 1937

2,087,087

UNITED STATES PATENT OFFICE 2,087,087

BOLT MAKING MACHINE

John H. Friedman, Tiffin, Ohio, assignor to The National Machinery Company, Tiffin, Ohio, a corporation of Ohio Application November 13, 1935, Serial No. 49,478

13 Claims. (Cl. 10—20)

This invention relates to a machine for making bolts and more particularly to an apparatus employed to trim the head of a bolt and is suited for use with a combined machine such as that shown in the patent to Earl R. Frost, No. 2,020,658, November 12, 1935, or in other machines wherein the headed bolt blank is trimmed by forcing the blank through a trimming die and the trimmed blank is conducted from the die through a passageway. In machines of the type disclosed in said application headed blanks are successively forced through a hollow trimming punch mounted in the header slide and are progressively advanced through the punch in the header slide and through a passageway formed therein in alignment with the hollow trimming punch. The header slide passage terminates in a transferring device which leads the trimmed blanks to the next fabricating mechanism such as a pointer mechanism or roll threader. Whereas in said copending application the blanks are frictionally retained by the passageway in alignment with the trimming die the present invention is directed more particularly to a device which may supplement or replace the retaining action of the passageway. The present improvement is particularly useful and provides important functional advantages in connection with the trimming of long bolt blanks.

In machines of the type referred to it will be understood that subsequent to the trimming operation the header slide recedes rapidly from the bed frame dies and it is important that if the shank end of a blank project from the hollow trimming tool after the trimming operation that it be positioned so that its shank end may contact the head of the next blank in the series upon the return of the header slide toward the bed frame dies. In the event the blank were misaligned or that the shank end were to drop down and tilt the blank within the hollow trimming tool, the blank might become jammed within the trimming tool and prevent the orderly progressive movement of the series of blanks through the header slide passage. The header slide in its rapid recession may through the inertia effect of a long heavy blank fail to maintain the blank in position at the open end of the trimming tool and the inertia effect of the blank may in certain cases be sufficient to dislodge the blank completely from the tool through the open end thereof.

It is among the objects of my invention to provide a bolt machine header slide with a hollow trimming tool having a retaining means to positively control the directional movement of blanks through the tool and maintain the axis of the bolt blank in alignment with the axis of the trimming tool. A further object of my invention is to provide a trimming tool with a retaining means to engage the underside of the head of the bolt blank forced into the trimming tool and prevent a reversal of bolt blank movement with respect to the trimming tool. A further object of my invention is to provide a hollow trimming tool with a resilient latch means to engage a bolt blank forced into the trimming tool to maintain the axial alignment of the bolt blank within the tool and prevent reversal of bolt blank movement within the tool. Further objects and advantages relating to simplicity in construction and economies in manufacture will become apparent from the following description and the attached drawing, wherein:

Figure 1:
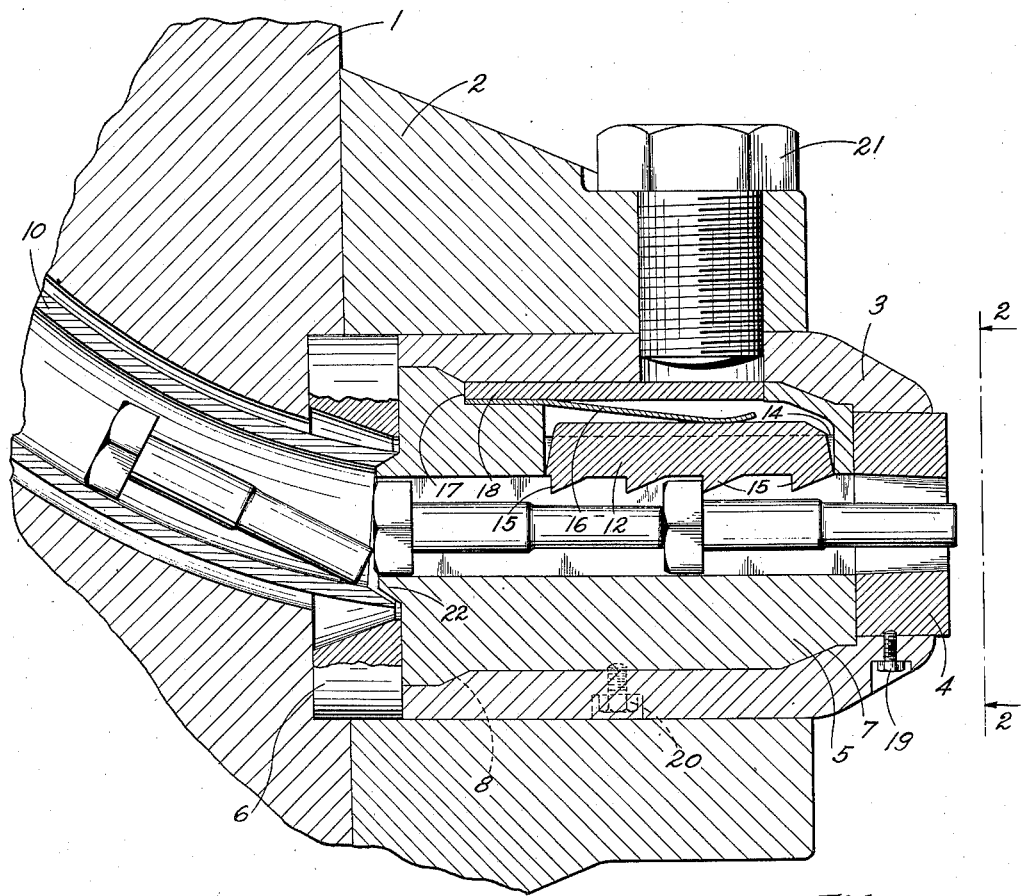
Figure 1 is a transverse sectional view of a trimmer punch constructed according to my invention.

A reciprocating header slide 1 is mounted on a bed frame (not shown) and is cored out to provide an opening for a blank conducting tube 10 as disclosed in said copending application. The forward face of the header slide is preferably fitted with a bolster as at 2 which is centrally bored to provide an aperture for the trimming tool 3 which in turn is bored out to receive the trimming die 4. The header slide is formed with a circular recess in alignment with the bore in the bolster 2 and receives therein a back-up ring 6 which extends forwardly of the face of the slide into the bore of the bolster. Headed bolt blanks upon being ejected from a holder die (not shown) are forced through the trimming die 4 which may be hexagonal as in the present embodiment or square to trim the bolt blanks to the desired head shape. To prevent the trimmed bolt blanks from moving back through the trimming die 4 by their own inertia as the header slide rapidly recedes from the bed frame dies, the hollow trimming tool 3 is provided with a retaining device which preferably comprises a sleeve 5 which is contoured to fit snugly within the hollow trimming tool or die holder 3.

Figure 2:
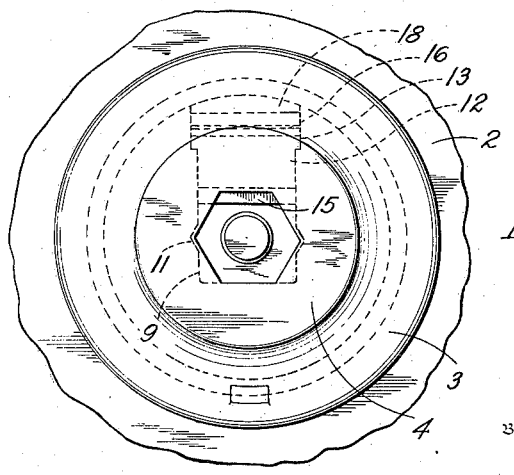
Figure 2 is an end elevation looking toward the trimming tool mounted on the header slide along line 2—2 of Figure 1.

The forward end of the sleeve 3 may be tapered as shown at 7 and the rear end of the sleeve provided with a bevelled shoulder as at 8 to facilitate the assembly and more efficiently transmit the working forces between the header slide to the trimming die. To form a smooth self-centering joint with the header slide tube 10 the rear face of the sleeve is preferably shaped to provide a cone 22 received within the chamfered end of the tube 10. Internally the sleeve 5 may be shaped in cross section as best shown in dotted lines in Figure 2 wherein a substantially square passage 9 is longitudinally grooved as at 11 on two sides and thus may receive either square bolts through the squared outlet 9 or hexagonal bolts wherein a pair of opposed corners on the hex are accommodated by the grooves 11.

Preferably the upper wall of the longitudinal passage 9 is cut away to receive a serrated or notched latch member 12. The member 12 is shouldered as at 13 to rest in complementary ledges 14 which limit the downward movement or the extent of the projection of the latch member into the passageway 9. The teeth or serrations 15 formed on the underside of the latch project into the passageway area traversed by the bolt heads as they are advanced through the passageway and are normally urged into said projecting position by a leaf spring 16 secured to the sleeve 5 in recess 17 by a wedge plate 18. The projections 15 are preferably bevelled on the side toward the trimming die 4 so that as the bolt blank is advanced through the trimming punch toward the tube 10 the latch member 12 is merely raised within its opening in the sleeve against the action of the spring 16. A number of projections 15 may be provided at irregularly spaced points on the latch member so as to accommodate bolt blanks and heads of various extent and position and retain said blanks irrespective of the extent of projection of the blank into the trimming tool.

To assemble the device the sleeve member 5 carrying the spring pressed latch 12 may be inserted from the rear of the trimming tool 3 and abuts the trimming die 4 held at the forward end of the tool 3 by set screw 19. The sleeve 5 is retained in position within the trimming tool 3 by means of set screw 20 or analogous device and the member 3 carrying the sleeve is positioned within the bolster and retained therein by a cap screw 21. As a headed blank is forced into the trimming tool 4 the back-up pressure of the trimming action is transmitted from the rear face of the die 4 to the forward end face of the sleeve 5 and thence through the sleeve 5 through the rear end face of same to the back-up ring 6 arranged in the header slide. This construction provides a sturdy trimming device well suited to transmit the forces encountered in trimming and one which will positively insure that all the blanks moved into the hollow trimming die during the trimming operation will be maintained in axial alignment throughout their movement through the trimming tool. The inertia effect of the blanks will be ineffective to move the blanks back through the trimming die between the header slide and the bed frame.

Although I have described one modification of my invention in detail, I have done so merely for the purpose of illustration and since variations could be made by those skilled in the art without departing from the scope of my invention, I wish to be limited only by what is claimed.

I claim:

1. In combination, a header slide having a passageway therein, a hollow trimming punch carried by said header slide arranged at one end of said passageway and means within the trimming punch to engage the trimmed blanks therein and maintain the axial alignment of said blanks within the punch.

2. In combination, a header slide having a passageway formed therein, a hollow trimming punch carried by said header slide arranged at one end of and in communication with said passageway, a spring pressed latch means arranged within said trimming punch to engage trimmed blanks as they are moved through said punch toward said passageway and maintain the axial alignment of said blanks as they are advanced through the trimming tool.

3. A trimming tool having a trimming die arranged at its forward end and a hollow passageway formed in alignment with the trimming die opening to receive bolt blanks as they are forced within the tool through the trimming die, a latch means having portions projecting into said passageway to engage bolt blanks therein and prevent movement of the bolt blanks outwardly through the trimming die.

4. A trimming tool having a hollow passageway therethrough and a trimming die at one end of said tool in alignment with said passageway, a resilient latch having portions arranged to project into said passage and engage trimmed bolt blanks moved into the said passage through said trimming die.

5. In a bolt machine, a reciprocating header slide having a hollow passageway formed therein, a hollow tool arranged to receive headed bolt blanks arranged at one end of said passage on the face of said header slide, a latch in said tool having portions to engage said headed blanks and restrict their axial movement to a movement toward said header slide passageway.

6. In a machine for making bolts, a trimming tool comprising a trimming die and a passageway adjacent said die and in alignment therewith, means projecting within said passageway to engage the underside of the heads of bolt blanks moved therein to restrain said blanks from movement toward said trimming die.

7. In a machine for making bolts, a trimming tool comprising a trimming die and a passageway adjacent said die and in alignment therewith, resilient latch means projecting within said passageway to engage the underside of the heads of bolt blanks moved therein to restrain said blanks from movement toward said trimming die.

8. In a machine for making bolts and the like, a hollow tool having an opening at one end shaped to receive headed bolt blanks, a passageway in said tool in alignment with said opening adapted to receive and guide bolt blanks advanced into said passageway through said opening, means arranged within said passageway to engage and bear against a radial face of the heads of bolt blanks moved into said passageway whereby said blanks are restrained against axial movement in a direction toward said opening.

9. In a machine for making bolts and the like, a hollow tool having an opening at one end shaped to receive headed bolt blanks, a passageway in said tool in alignment with said opening adapted to receive and guide bolt blanks advanced into said passageway through said opening, spring pressed latch means arranged within said passageway to engage and bear against a radial face of the heads of bolt blanks moved into said passageway whereby said blanks are restrained against axial movement in a direction toward said opening.

10. In a machine for making bolts and the like, a reciprocating header slide having a passageway formed therein, a tool mounted on the face of said header slide having a passageway arranged at one end of and communicating with said first named passageway, a trimming die carried by said tool in alignment with said passageways and means arranged within one of said passageways to engage the underside of the head of trimmed bolt blanks moved therein to prevent movement of said blanks toward said trimming die during the reciprocation of said header slide.

11. In combination, a header slide having a hollow tool mounted thereon, a die arranged within an axial bore at the forward end of said tool, a sleeve disposed within said tool to bear against the rear face of said die, a thrust ring interposed between the header slide and the rear face of said sleeve whereby the thrust on the die may be transmitted through said sleeve and ring to the header slide, a passageway formed in said sleeve to conduct blanks moved therein toward the header slide, and means within said passageway to prevent movement of said blanks away from the header slide and toward said die.

12. A trimming punch having a trimming die arranged at the forward end thereof, a hollow sleeve within the punch coaxial with the die opening adapted to receive and guide bolt blanks moved therein, said hollow sleeve presenting an opening having a substantially square cross section formed by a pair of opposed flat side walls and a pair of opposed longitudinally grooved side walls whereby said sleeve is adapted to selectively receive square headed bolt blanks engaging the four side walls or hex headed bolts engaging the grooved portions of one pair of walls and the flat portion of the other pair.

13. A trimming punch having a trimming die arranged at the forward end thereof, a hollow sleeve within the punch coaxial with the die opening adapted to receive and guide bolt blanks moved therein, said hollow sleeve presenting an opening having a substantially square cross section formed by a pair of opposed flat side walls and a pair of opposed longitudinally grooved side walls whereby said sleeve is adapted to selectively receive square headed bolt blanks engaging the four side walls or hex headed bolts engaging the grooved portions of one pair of walls and the flat portion of the other pair, and a latch means arranged in one of the said flat walls to engage the heads of said blanks to maintain a unidirectional movement of same.

JOHN H. FRIEDMAN.